July 22, 1952  T. R. LAING  2,604,102
LIQUID HAIR APPLICATOR DEVICE
Filed June 3, 1946
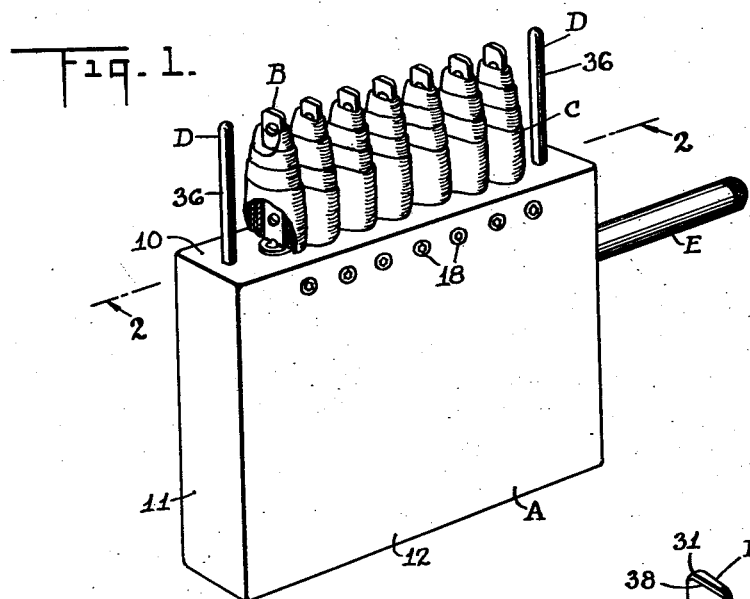
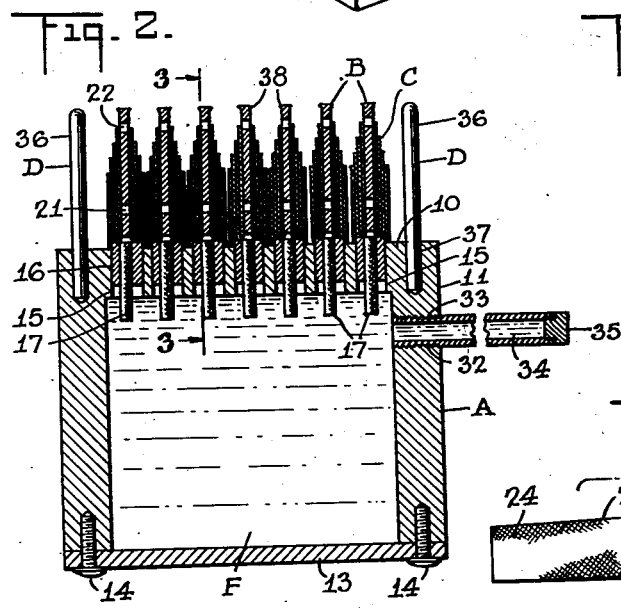
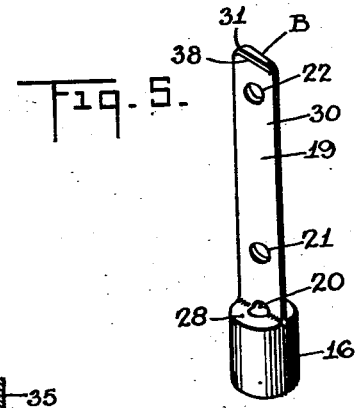
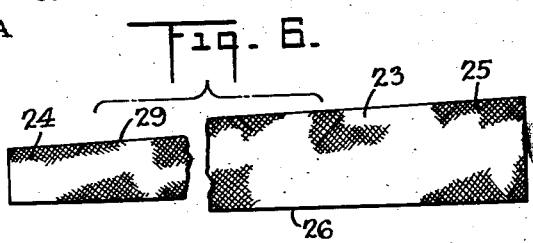
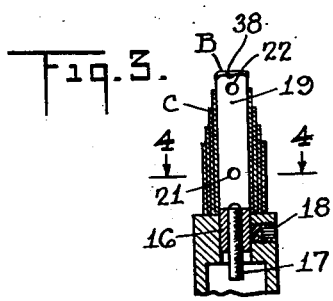
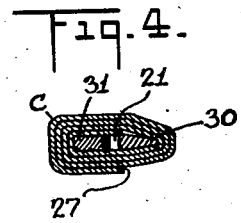
INVENTOR
Torrance R. Laing
BY
ATTORNEY Patented July 22, 1952

2,604,102

UNITED STATES PATENT OFFICE 2,604,102

LIQUID HAIR APPLICATOR DEVICE

Torrance R. Laing, New York, N. Y.; Matilde E. Krause executrix of said Torrance R. Laing, deceased Application June 3, 1946, Serial No. 673,958

9 Claims. (Cl. 132—13)

The present invention relates to an applicator device and it particularly relates to a comb device for applying dyeing, bleaching and treating liquids to the hair.

Although the comb has a particular application in connection with human hair, it may also be used in the treatment of or in dyeing or liquid application to animal hair on living animals or on skins and furs.

It is among the objects of the present invention to provide an improved applicator device and particularly a comb device for applying liquids or fluids and desirably dyeing, bleaching and/or other treating fluids to the hair.

A further object is to provide an applicator device which without contact with and desirably without application to the skin or scalp will correctly apply a liquid treatment to the hair.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It is among the features of the present invention to provide a liquid container of rectangular, cylindrical, spherical or ovular shape having a plurality of parallel closely spaced teeth or contact members in liquid connection with the interior of the container. The flow of liquid is controlled by wicks and by wrapping the teeth in absorbent materials. This absorbent material does not extend to the ends of the teeth so that the treatment will not be applied by the ends of the teeth to the scalp or skin.

In the drawings which show an embodiment of the invention by way of illustration and not by way of limitation:

Fig. 1 is a side perspective view of the applicator device according to the present invention, Fig. 2 is a vertical side sectional view upon the line 2—2 of Fig. 1, Fig. 3 is a fragmentary vertical transverse sectional view upon the line 3—3 of Fig. 2 of one of the teeth or blades, Fig. 4 is a transverse horizontal sectional view of one of the teeth upon the line 4—4 of Fig. 3 upon an enlarged scale as compared to Fig. 3, Fig. 5 is a perspective view upon an enlarged scale of one of the teeth or blades of Figs. 1 and 2, and Fig. 6 is an elevational view of one of the unwound absorbent strips upon an enlarged scale as compared to Figs. 1 to 4 and broken away to shorten the length shown thereof.

Referring to Fig. 1, the liquid applicator or tooth comb is provided with a container A for liquid treating material, whether for bleaching or dyeing, comb members B, absorbent members C, side protectors D and an optional auxiliary reservoir E.

The reservoir or container A, as best shown in Fig. 2, is of rectangular shape, but it may be of elliptical, cylindrical or even ovular shape. It has a top wall 10, narrow side walls 11, wide side walls 12, and a removable bottom wall 13. The top wall 10 may also be removable. The bottom wall 13 is held in position by the screws 14.

The top wall 10 has a plurality of spaced openings 15 receiving the centrally bored feed plugs or tubular roots 16. The feed plugs or tubular roots 16 receive the wicks 17 which control the flow therethrough. These plugs or tubular roots 16 are held in position by the set screws 18. Each of these plugs or tubular roots 16 carries an upward extension 19 forming one of the comb blades or teeth B. The extension 19 is provided with a base opening 20 and upper transverse openings 21 and 22.

The opening 20 permits flow of liquid F from the container A through the wicks 17 into the absorbent C. The absorbent gauze C consists of a strip 23 of cheese cloth or other suitable fabric, narrow at one end 24 and wide at the other end 25. The wide end 25 is first tacked or stitched onto the blade or tooth 19 by the openings 21 and 22. The strip 23 is then wound upon the blade or tooth 19 with its bottom straight edge 26 closely adjacent the top of the plug and the top slanting edge 29 forming the offset upper edges of the absorbent material C upon the comb blade 19. The blade or tooth 19 also has an upper enlargement 38 to prevent the material C from slipping off the top of the blade or tooth 19, but the stitching at the holes 21 and particularly 22 will normally be sufficient to hold the material C in the position shown in Fig. 2. It will be noted that the blades 19 are wedge shaped, being enlarged at 31 and narrowed at 30.

The end protectors 36 fitted at their lower ends into the recesses 37 will protect the teeth 19 against damage in case the applicator is dropped. The auxiliary reservoir E is formed of a tube 34. The tube 34 has a threaded portion 33 which is screwed into a tapped socket 32 in the wall 11. It is sealed at its end by the plug 35. The reservoir 34 may be removed, if desired, and the opening 32 plugged.

In operation the comb is grasped at the container A and stroked through the hair. The liquid F will seep through the wicks 17 and saturate the cloth C and treat the hair without staining or affecting the scalp. The absorbent material C may be readily removed by breaking the stitching through the holes 21 and 22. A new absorbent strip may then be applied and the blade replaced.

As many changes could be made in the above applicator device and many apparently widely different embodiments of this invention could be made without departing from the scope of the claims, it is intended that all matter contained in the above description or shown in the accompanying drawings, shall be interpreted as illustrative and not in a limiting sense.

What is claimed is:

1. A liquid applicator for hair comprising a liquid container and a plurality of closely spaced teeth extending from said container, said container being provided with passageways extending from the interior of said container to feed treating liquid to said teeth, said teeth being flat and having a plurality of transverse openings, the lowermost transverse opening opening into the interior of the container and a strip of absorbent gauze being wound around said teeth, said absorbent gauze strip being sewn to said teeth by stitches extending through the openings in said teeth.

2. A liquid applicator for hair comprising a liquid container and a plurality of closely spaced teeth extending from said container, said container being provided with passageways extending from the interior of said container to feed treating liquid to said teeth, said teeth being flat and having a plurality of transverse openings, the lowermost transverse opening opening into the interior of the container and a strip of absorbent gauze being wound around said teeth and flow controlling wicks positioned in said passageways, said absorbent gauze strip being sewn to said teeth by stitches extending through the openings in said teeth.

3. A liquid applicator for hair comprising a liquid container and a plurality of closely spaced teeth extending from said container, said teeth having tubular roots mounted in said container, said container being provided with recesses extending from the interior of said container to feed treating liquid to said teeth, said teeth being wound in cotton gauze and being provided with openings to enable said cotton gauze to be sewn into position, said absorbent gauze strip being sewn to said teeth by stitches extending through the openings in said teeth.

4. In a comb for applying a dyeing or bleaching liquid to the hair, a rectangular container having a removable bottom wall to enable liquid to be placed in the container and a top wall having a plurality of spaced openings positioned side by side in said top wall and a plurality of wedge shaped blade members, absorbent material wound on said members, said members being provided with plugs fitted into said openings, said plugs being provided with axial passageways to conduct liquid to said blade members and wicks positioned in said passageways.

5. A liquid applicator having a container serving as a handle and toothed comb mounted on one side of said container, each of the teeth of said comb being wrapped in absorbent gauze, and said absorbent gauze being stitched to said teeth, and the teeth of said comb being individually removably mounted in recesses on said side of said container, said recesses in said container communicating and opening into the interior of said container and permitting flow of liquid from the interior of said container through said tubular roots to the outside of each tooth.

6. A liquid applicator having a container serving as a handle and a toothed comb mounted on one side of said container, each of the teeth of said comb being wrapped in absorbent gauze, and said absorbent gauze being stitched to said teeth, and the teeth of said comb being individually removably mounted in recesses on said side of said container, said teeth each having a tubular root permitting flow of liquid to the teeth of said comb, said tubular root being provided with an exit passageway to the outside of each tooth and thus providing a flow passage from the container through the tubular root to the outside of each tooth, said recesses in said container communicating and opening into the interior of said container and permitting flow of liquid from the interior of said container through said tubular roots to the outside of each tooth.

7. A liquid applicator having a container serving as a handle and a toothed comb mounted on one side of said container, the teeth of said comb being individually removably mounted in recesses on said side of said container, said teeth each being wrapped in a strip of absorbent gauze, said teeth having tubular roots with flow passages to the interior of the teeth to permit flow of liquid from the container to the interior of the teeth, said recesses in said container communicating and opening into the interior of said container and permitting flow of liquid from the interior of said container through said tubular roots to the outside of each tooth.

8. A liquid applicator having a container serving as a handle and a toothed comb mounted on one side of said container, each of the teeth of said comb being wrapped in absorbent gauze, and said absorbent gauze being stitched to said teeth, and the teeth of said comb being individually removably mounted in recesses on said side of said container, said teeth each having a tubular root permitting flow of liquid to the teeth of said comb, said tubular roots carrying absorbent wicks, said tubular root being provided with an exit passageway to the outside of each tooth and thus providing a flow passage from the container through the tubular root to the outside of each tooth, said recesses in said container communicating and opening into the interior of said container and permitting flow of liquid from the interior of said container through said tubular roots to the outside of each tooth.

9. A liquid applicator having a container serving as a handle and a toothed comb mounted on one side of said container, the teeth of said comb being individually removably mounted in recesses on said side of said container, said teeth each being wrapped in a strip of absorbent gauze, said teeth having transverse openings permitting the gauze to be sewn onto the teeth, said absorbent gauze strip being sewn to said teeth by stitches extending through the openings in said teeth, said teeth having tubular roots with flow passages to the interior of the teeth to permit flow of liquid from the container to the interior of the teeth, said recesses in said container communicating and opening into the interior of said container and permitting flow of liquid from the interior of said container through said tubular roots to the outside of each tooth.

TORRANCE R. LAING.

REFERENCES CITED

The following references are of record in the file of this patent:

UNITED STATES PATENTS

| Number | Name | Date |
|---|---|---|
| 85,311 | Kerr, Jr., et al. | Dec. 29, 1868 |
| 734,704 | Harrison | July 28, 1903 |
| 1,067,930 | Lewinski | July 22, 1913 |
| 1,322,268 | St. Clair | Nov. 18, 1919 |
| 1,566,886 | Lillie | Dec. 22, 1925 |
| 1,847,347 | Maisto | Mar. 1, 1932 |
| 2,226,478 | Ostroff | Dec. 24, 1940 |

FOREIGN PATENTS

| Number | Country | Date |
|---|---|---|
| 39,990 | France (Addition to 696,800) | Mar. 21, 1932 |